(12) United States Patent
Castro et al.

(10) Patent No.: US 8,803,511 B2
(45) Date of Patent: Aug. 12, 2014

(54) GEARBOX POSITION DETECTION

(75) Inventors: Pascal Castro, Mondeville (FR);
Vincent Guibet, Mondeville (FR)

(73) Assignee: SC2N, Creteil (FR)

( * ) Notice: Subject to any disclaimer, the term of this patent is extended or adjusted under 35 U.S.C. 154(b) by 534 days.

(21) Appl. No.: 12/664,508

(22) PCT Filed: Jun. 12, 2008

(86) PCT No.: PCT/EP2008/057436
§ 371 (c)(1),
(2), (4) Date: May 21, 2010

(87) PCT Pub. No.: WO2008/155289
PCT Pub. Date: Dec. 24, 2008

(65) Prior Publication Data
US 2010/0253325 A1    Oct. 7, 2010

(30) Foreign Application Priority Data

Jun. 13, 2007 (FR) ...................... 07 04220

(51) Int. Cl.
*G01B 7/14* (2006.01)
*F16H 59/70* (2006.01)
*F16H 61/12* (2010.01)
*F16H 59/68* (2006.01)

(52) U.S. Cl.
CPC ........ *F16H 59/70* (2013.01); *F16H 2061/1208* (2013.01); *F16H 2059/6823* (2013.01); *F16H 2061/1284* (2013.01)
USPC ............. 324/207.15; 324/207.16; 324/207.17

(58) Field of Classification Search
USPC .................................................. 324/207.15
See application file for complete search history.

(56) References Cited

U.S. PATENT DOCUMENTS

| | | | | |
|---|---|---|---|---|
| 3,875,501 A | * | 4/1975 | Hayashi | 324/712 |
| 4,445,393 A | | 5/1984 | Braun | |
| 4,732,246 A | * | 3/1988 | Tateno et al. | 477/78 |
| 5,161,422 A | * | 11/1992 | Suman et al. | 74/335 |

(Continued)

FOREIGN PATENT DOCUMENTS

| | | |
|---|---|---|
| DE | 102 53 035 A1 | 1/2004 |
| EP | 0 242 086 A2 | 10/1987 |

(Continued)

OTHER PUBLICATIONS

International Search Report w/translation from PCT/EP2008/057436 dated Nov. 19, 2008 (6 pages).

(Continued)

*Primary Examiner* — Richard Isla Rodas
(74) *Attorney, Agent, or Firm* — Osha Liang LLP

(57) ABSTRACT

The invention relates to a motor vehicle gearbox position detector comprising a sensor (3) designed to cooperate with a moving target (5) connected to a gearbox ratio actuation element so as to provide at least one analog signal representative of the position of the neutral point of the gearbox, characterized in that it additionally comprises a unit for processing the signal (9) comprising an analog-to-digital converter designed to convert the analog signal into a digital output signal (17) so as to provide periodic predefined information corresponding to the position of the neutral point only when, on the one hand, the target (5) is in the neutral point position and, on the other hand, when the sensor (1) is in the normal operating state.

14 Claims, 2 Drawing Sheets

(56) References Cited

U.S. PATENT DOCUMENTS

| | | | |
|---|---|---|---|
| 5,486,147 A * | 1/1996 | Sakakiyama et al. | 477/125 |
| 6,018,294 A * | 1/2000 | Vogel et al. | 340/456 |
| 6,545,462 B2 | 4/2003 | Schott et al. | |
| 6,773,369 B2 * | 8/2004 | Altenkirch et al. | 475/132 |
| 6,923,083 B2 * | 8/2005 | Fujinuma | 74/473.33 |
| 7,038,448 B2 | 5/2006 | Schott et al. | |
| 7,139,653 B2 * | 11/2006 | Ringger et al. | 701/51 |
| 7,443,159 B2 * | 10/2008 | Habenschaden et al. | 324/207.24 |
| 7,701,201 B2 * | 4/2010 | Zapf et al. | 324/207.17 |
| 2005/0231193 A1 * | 10/2005 | Yamamoto et al. | 324/207.2 |
| 2005/0258687 A1 * | 11/2005 | Zapf et al. | 307/106 |
| 2008/0142346 A1 * | 6/2008 | Zapf et al. | 200/61.88 |

FOREIGN PATENT DOCUMENTS

| | | |
|---|---|---|
| EP | 0 273 874 A2 | 7/1988 |
| FR | 2 818 725 A1 | 6/2002 |
| JP | 07-046215 A | 2/1995 |
| JP | 08-326886 A | 12/1996 |
| JP | 09-008731 A | 1/1997 |
| JP | 3353538 B2 | 12/2002 |
| WO | 2005/064281 A1 | 7/2005 |

OTHER PUBLICATIONS

Translation of Japanese Office Action issued in Japanese Patent Application No. 2010-511,652, mailing date Mar. 5, 2013 (2 pages).

Translation of Office Action issued in corresponding Chinese Application No. 200880102621.3 dated Jul. 25, 2013 (9 pages).

\* cited by examiner

GEARBOX POSITION DETECTION

The present invention relates to a motor vehicle gearbox position sensor.

Automatic or robotized gearbox position sensors are known. These sensors are provided from the design of a gearbox and incorporated into it, often at the actuators making it possible to carry out gear changes. For these sensors, various technologies are applied. For example, potentiometer-based position sensors are known for ascertaining the position of an actuator and for deducing therefrom the position of the gearbox, that is to say whether a gear ratio is engaged and if so which one.

Other technologies, such as Hall-effect magnetic technologies or inductive technologies, have also recently found their application in the context of position sensors for automatic or robotized gearboxes. As an example, there is WO 2005/064281 which describes an integrated position sensor which uses Hall effect to detect the position of a transmission shaft of the gearbox specifically encoded by magnets in several regions. However, this sensor is complex and very costly.

Recently, in the automobile field, systems called "STOP&START" have appeared for vehicles fitted with a robotized or automated gearbox. These are systems which manage the stopping of the engine when the vehicle stops for a predefined period, for example at a red light, and which automatically start the engine when the driver again presses on the accelerator pedal.

This system makes it possible, particularly in town, to save a considerable quantity of fuel and for this reason is having considerable success.

It is necessary to know that, for safety reasons, it is essential to ascertain the position of the gearbox when stopped before restarting the engine.

Specifically, the gearbox must be in its neutral position, that is to say with no gear ratio engaged, in order to prevent the vehicle being propelled forward on startup, which could easily cause an accident.

To detect whether no gear is engaged, provision is made for a gearbox position sensor to transmit an output signal representative of the neutral position.

It is then essential to be sure that this position sensor is operating normally, that is to say that it is not faulty and that the transmitted signal is certain to indicate the neutral position.

Devices improving the safety of the measurement of the position sensor are already known. These devices prevent an incorrect interpretation of the transmitted signal in the event of a short circuit between the output signal and ground or in the event of an open circuit on the sensor supply.

For this, these devices provide for the sensor to include a circuit of resistors making it possible to provide an output voltage which is neither zero nor equal to the value of the sensor supply. The output signal then has an intermediate value distinct from a low short-circuit level and distinct from a high open-circuit level.

However, these devices do not make it possible to identify all the defects that are likely to occur on the electric circuit of the sensor.

Notably, these devices do not allow the identification of an inappropriate impedance present on a cable of the electric circuit or on a connector. This impedance may appear for example when an abnormal resistance appears at the connectors (contact resistance) or in the supply cable. The output signal then has an incorrect intermediate analog value that does not correspond to the true position of the gears.

To solve these problems, the object of the present invention is to propose a gearbox position sensor for which it is possible to verify the integrity of the output signal transmitted at every moment, irrespective of the type of fault that is likely to occur.

Accordingly, the subject of the invention is a motor vehicle gearbox position sensor comprising a probe capable of interacting with a mobile target connected to an element for actuating the ratios of a gearbox in order to supply at least one analog signal representative of the neutral position of the gearbox, characterized in that it also comprises a signal processing unit comprising an analog-digital converter capable of converting the analog signal into a digital output signal in order to provide a predefined periodic item of information corresponding to the neutral position only when, on the one hand, the target is in the neutral position and, on the other hand, when the sensor is in a normal operating state.

A further subject of the invention is a gearbox comprising a position sensor as defined above.

The invention also proposes a method for detecting the neutral position of a motor vehicle gearbox, comprising a position sensor as defined above, characterized in that the analog signal is converted into a digital output signal in order to provide a predefined periodic item of information corresponding to the neutral position only when, on the one hand, the target is in the neutral position and, on the other hand, when the sensor is operating normally.

Other advantages and features will appear on reading the description of the invention and the appended drawings in which:

In these figures, identical elements bear the same reference numbers.

FIG. 1 shows a schematic view of a position sensor 1 according to the invention, capable of being mounted on a motor vehicle manual or automatic gearbox housing, not shown.

The gearbox comprises an element for actuating the various gear ratios according to the commands applied by a gear lever via a linkage system (see for example the gearbox described in EP 0 273 874).

The actuation element may, for example, be an actuation rod, a jaw clutch or a cam of the gearbox.

The position sensor 1 comprises a probe 3 capable of interacting with a target 5.

The target 5 is connected to the element for actuating the ratios of the gearbox in order to be able to be moved with it and be representative of an engaged gear or neutral.

Therefore, in operation, the probe 3 and the target 5 interact to provide at least one analog signal representative of the neutral position or of the engaged gear of the gearbox.

The probe 3 is, for example, a magnetic-effect, optical-effect or inductive-effect probe.

A preference will be given to a Hall effect probe 3 capable of measuring a magnetic field in order to determine the position of the target 5 in space and in order to deduce therefrom the neutral position or an engaged gear of the gearbox.

The Hall effect probe 3 advantageously comprises Hall cells placed on an integrated circuit and a flux concentrator in order to measure the magnetic field (as an example see documents U.S. Pat. No. 6,545,462 and U.S. Pat. No. 7,038,448).

The target 5 is designed to be magnetized, that is to say having a nonzero permeability.

Figure 1:
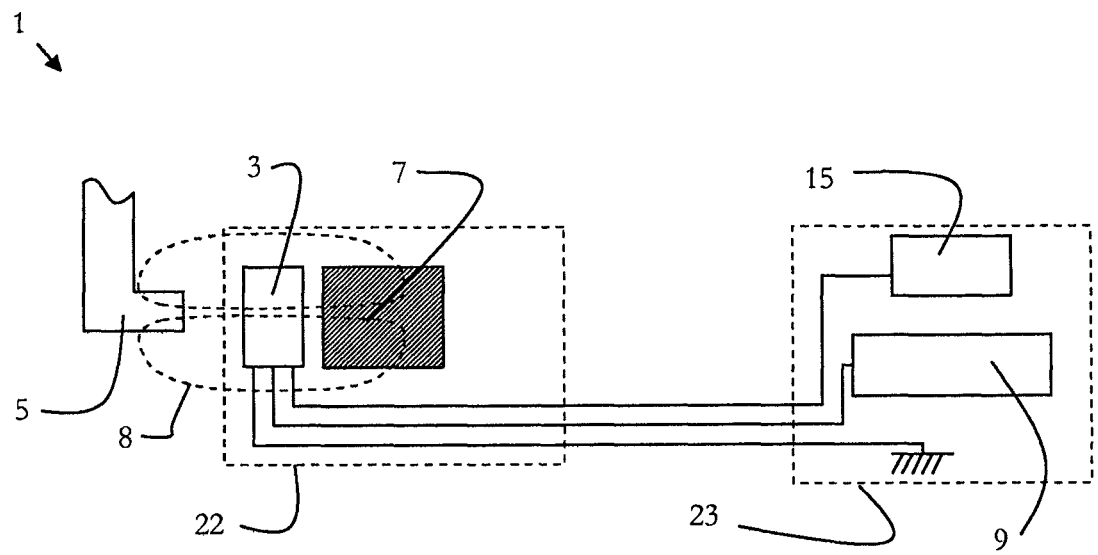
FIG. 1 is a schematic view of a position sensor according to the invention.

For a metal target 5, there is a magnet 7 close to the Hall effect probe 3, so that the probe 3 is traversed by the magnetic field lines 8 formed between the magnet 7 and the target 5, as can be seen in FIG. 1.

Therefore, in operation, when the target 5 is substantially facing the probe 3, the latter measures the variation of the magnetic field and detects the neutral or gear ratio position.

If the sensor 1 comprises an optical-effect probe 3, the target 5 is designed to interact optically with the probe 3.

The optical probe 3 can therefore detect a variation in the optical signal when it is substantially facing the target 5.

The analog signal is for example a current or a voltage.

According to the invention, the sensor 1 also comprises a signal processing unit 9 comprising an analog-digital converter capable of converting the analog signal into a digital output signal 17 in order to provide a predefined periodic item of information corresponding to the neutral position only when, on the one hand, the target 5 is in the neutral position and, on the other hand, when the sensor 1 is in a normal operating state.

Figure 2:
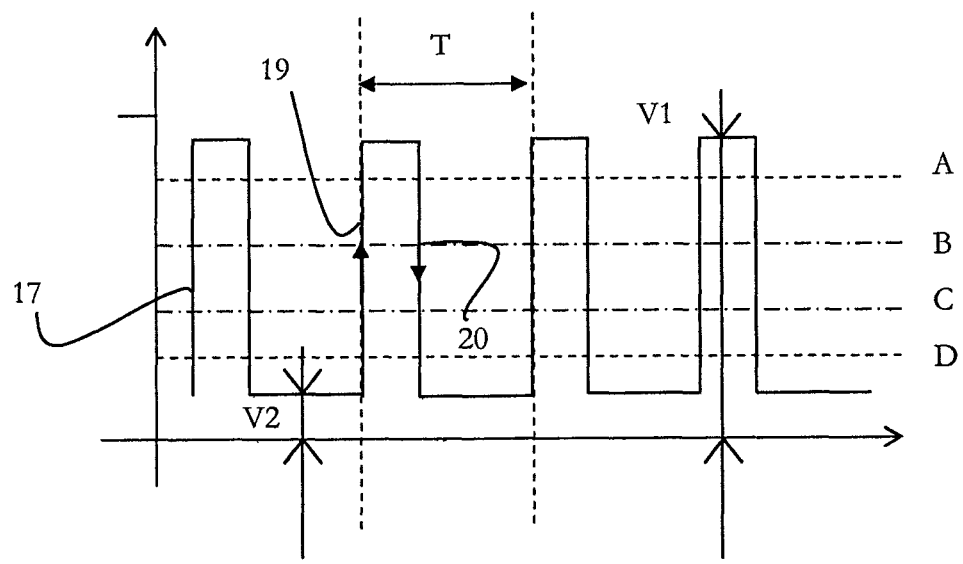
FIGS. 2, 3 and 4 are graphs representing the output signal of the sensor of FIG. 1.

This gives a digital output signal 17 corresponding to the neutral position or an engaged gear position, substantially in the form of a slot comprising a top amplitude V1, a bottom amplitude V2 and at least two successive transitions 19 and 20 in a period of time T, as shown in FIG. 2.

For example, the first transition 19 is positive, that is to say that the amplitude of the signal passes from a value V1 to a lower value V2, with a slope that is preferably zero, and the second transition 20 is negative between V2 and V1.

A zero slope makes it possible to prevent an indeterminate position of the gearbox gear ratio.

In the latter situation, it is also possible to have the processing unit 9 attribute arbitrarily to the transitional values of the digital signal 17 a value that is equal either to the amplitude V1 or to the lower amplitude V2.

Therefore, in order to verify the integrity of the output signal 17 of the sensor 1, it is sufficient to verify the presence of two successive transitions 19, in the digital signal 17.

If, after a first transition 19 of the signal 17, and in the period T of the digital signal 17, no second transition 20 of the signal 17 is detected, then the sensor 1 is faulty.

Conversely, the detection of a second transition 20 informs the user, on the one hand, that a gear is or is not engaged and, on the other hand, that the item of information is perfectly reliable.

Therefore, a position sensor 1 is obtained that has improved reliability relative to the conventional sensors for analog encoding of the output information, such as, for example, with encoding at different voltage levels.

For this, the position sensor 1 advantageously has a digital bus (not shown) such as LIN or CAN, at the output of the processing unit 9, allowing the transmission of the digital output signal 17.

Alternatively, the analog-digital converter is a pulse-width modulation (PWM) converter.

It is therefore advantageously possible to encode differently a first digital output signal 17 corresponding to the neutral position and a second digital output signal 17 corresponding to an engaged gear position.

For example, the first digital output signal 17 comprises a high amplitude V1 for a period of the order of eighty percent of the period T and a low amplitude V2 for the rest of the period T.

Conversely, the second digital signal may comprise a high amplitude V1 for only twenty percent of the period T and a low amplitude V2 for the rest of the period T.

The assembly 22 comprising the probe 3, and optionally the magnet 7, may be separate from the assembly 23 comprising the processing unit 9 and the main power supply 15 of the sensor 1 (FIG. 1).

The processing unit 9 is also capable of encoding at least one additional periodic item of information in the digital output signal 17.

Therefore, the sensor 1 can transmit simultaneously, on the one hand, a gear position signal, such as the neutral position, and, on the other hand, a diagnostic signal corresponding to its operating state.

Advantageously, the processing unit 9 also comprises a diagnostic means capable of comparing the amplitude of the digital output signal 17 with a predefined threshold.

For example, the processing unit 9 measures the high amplitudes V1 and low amplitudes V2 of the digital output signal 17 and compares them with predefined values, in order to reveal the presence of an inappropriate contact resistance or a resistance that is present on a cable of the electric circuit of the sensor 1.

The processing unit 9 may therefore comprise several levels of operating threshold.

According to one exemplary embodiment, four thresholds A, B, C and D are predefined and stored in the processing unit 9.

Figure 3:
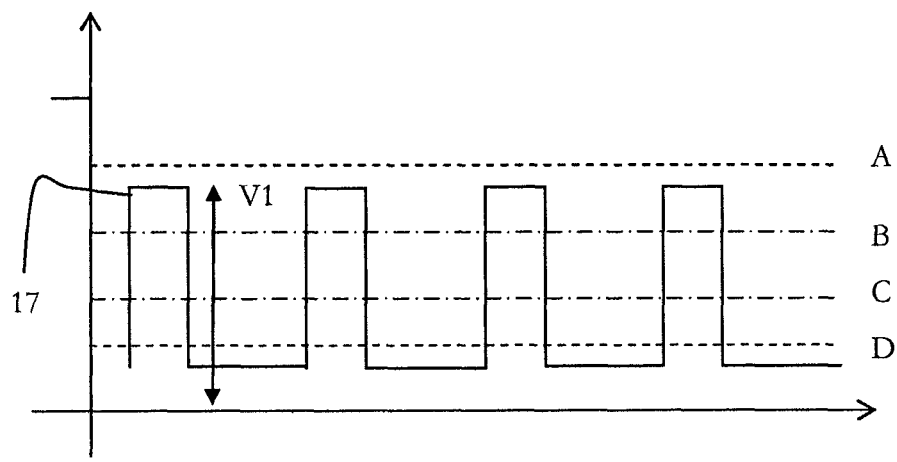
Figure 4:
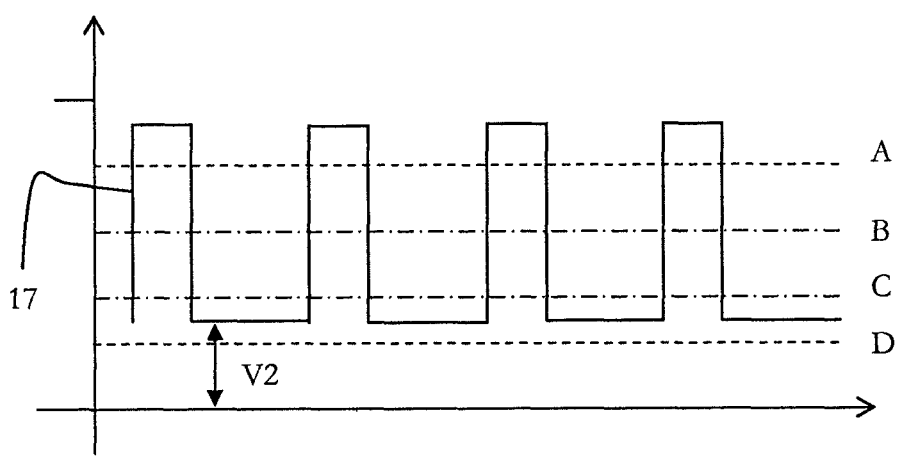

FIGS. 3 and 4 illustrate two situations in which the sensor 1 is operating normally, that is to say that it is not faulty and that the transmitted signal indicates with certainty the position of the engaged gear or of neutral, but in which situations a defect could appear.

Therefore, the high amplitude V1 of the output signal 17 must be higher than the first threshold A and the low amplitude V2 must be lower than the fourth threshold D for normal operation with no fault of the sensor 1 (FIG. 2).

When the amplitude V1 of the signal 17 is lower than the threshold A but higher than the second threshold B or when the amplitude V2 is higher than the threshold D but lower than the third threshold C, the sensor 1 is operating normally but maintenance may be necessary.

In FIG. 3, the amplitude V1 of the signal 17 is lower than the threshold A, which means that the item of information on the position of an engaged gear or of neutral is still correct but the sensor 1 requires maintenance.

In FIG. 4, the amplitude V2 of the signal 17 is higher than the threshold D, which means that the item of information on the position of a gear or of neutral is still correct but the sensor 1 requires maintenance.

It is also possible to provide that, when the high amplitude V1 of the signal 17 is lower than the threshold B, or when the low amplitude V2 is higher than the threshold C, the processing unit 9 stops transmission of the periodic item of information.

For this, provision is made for the processing unit 9 to be capable of stopping the transmission of the periodic item of information according to the result of the comparison of the diagnostic means by, for example, switching off the power supply of the probe 3 at the main power supply 15 of the sensor 1.

Therefore, the sensor 1 no longer transmits the output signal 17 when the amplitudes V1 and V2 are situated outside the predefined thresholds B and C, which makes it possible to ensure the accuracy of the transmitted information.

When this additional information is encoded in the digital output signal 17, the user is informed thereof and may plan to carry out maintenance.

Therefore, the output signal 17 comprises the information corresponding to the position of a gear or of neutral and the additional information reporting the more or less long-term need to carry out maintenance on the sensor 1.

It can therefore be understood that such a position sensor 1 also comprising a signal processing unit 9 comprising an analog-digital converter capable of providing a predefined periodic item of information corresponding to the neutral position only when, on the one hand, the target 5 is in the neutral position and, on the other hand, when the sensor 1 is in a normal operating state, makes it possible to have a sensor 1 that is secure, reliable, robust and having a low production cost and having a much safer diagnostic level than other solutions, such as electromechanical solutions for which the electric contact is likely to be interrupted unexpectedly in the event of vibration or corrosion of the contacts.

The invention claimed is:

1. A motor vehicle gearbox position sensor, comprising:
    a probe for interacting with a mobile target connected to an element for actuating the ratios of a gearbox to supply at least one analog signal representative of a neutral position of the gearbox; and
    a signal processing unit comprising an analog-digital pulse-width modulation (PWM) converter for converting the analog signal into a digital output signal whose pulse width corresponds to the neutral position, to provide a predefined periodic item of information corresponding to the neutral position only, when the target is in the neutral position and when the sensor is in a normal operating state,
    wherein the signal processing unit is further configured to compare an amplitude of the digital output signal with a predefined threshold to diagnose the digital output signal in order to reveal a presence of an inappropriate contact resistance or a resistance that is present on a cable of an electric circuit of the sensor,
    the sensor transmitting a diagnostic signal corresponding to an operating state of the sensor based on said comparison.

2. The position sensor as claimed in claim 1, wherein the processing unit is configured for encoding at least one additional periodic item of information in the digital output signal.

3. The position sensor as claimed in claim 1, wherein the processing unit is configured for stopping the transmission of the periodic item of information according to the result of the comparison of the diagnostic means.

4. The position sensor as claimed in claim 1, further comprising a digital bus, at the output of the processing unit, allowing the transmission of the digital output signal.

5. The position sensor as claimed in claim 1, wherein the analog signal is one of a current or a voltage.

6. The position sensor as claimed in claim 1, wherein the probe is one of a magnetic-effect, optical-effect or inductive-effect probe.

7. The position sensor as claimed in claim 6, wherein the probe is a Hall effect probe.

8. A gearbox comprising a position sensor as claimed in claim 1.

9. A method for detecting a neutral position of a motor vehicle gearbox, comprising a position sensor as claimed in claim 1, comprising:
    converting the analog signal into a digital output signal, by using said position sensor, to provide a predefined periodic item of information corresponding to the neutral position only when the target is in the neutral position and when the sensor is operating normally.

10. The detection method as claimed in claim 9, wherein at least one additional periodic item of information is encoded in the digital output signal.

11. A motor vehicle gearbox position sensor comprising:
    a Hall effect probe for interacting with a magnetized mobile target connected to an element for actuating the ratios of a gearbox to supply at least one analog signal representative of a neutral position of the gearbox; and
    a signal processing unit comprising an analog-digital pulse-width modulation (PWM) converter, for converting the analog signal into a digital output signal whose pulse width corresponds to the neutral position,
    wherein the signal processing unit is configured to compare an amplitude of the digital output signal with a predefined threshold to diagnose said digital output signal in order to reveal the presence of an inappropriate contact resistance or a resistance that is present on a cable of an electric circuit of the sensor,
    the sensor transmitting a diagnostic signal corresponding to an operating state of the sensor based on said comparison.

12. A motor vehicle gearbox position sensor comprising:
    a Hall effect probe for interacting with a magnetized mobile target connected to an element for actuating the ratios of a gearbox to supply at least one analog signal representative of a neutral position of the gearbox; and
    a signal processing unit comprising an analog-digital converter for converting said analog signal into a first digital output signal, the analog-digital converter being a pulse-width modulation (PWM) converter that encodes differently said first digital output signal corresponding to the neutral position and a second digital output signal corresponding to an engaged gear position,
    wherein the signal processing unit is configured to compare an amplitude of the first and second digital output signals with a predefined threshold to diagnose said first and second digital output signals in order to reveal the presence of an inappropriate contact resistance or a resistance that is present on a cable of an electric circuit of the sensor,
    the sensor transmitting a diagnostic signal corresponding to an operating state of the sensor based on said comparison.

13. A motor vehicle gearbox position sensor, comprising:
    a probe for interacting with a mobile target connected to an element for actuating the ratios of a gearbox to supply at least one analog signal representative of a neutral position of the gearbox; and
    a signal processing unit comprising an analog-digital converter which is a pulse-width modulation (PWM) converter for converting the at least one analog signal into at least one digital output signal whose pulse width corresponds to the neutral position, to provide a predefined periodic item of information corresponding to the neutral position only when the target is in the neutral position and when the sensor is in a normal operating state,
    wherein the processing unit is further configured to compare the high and low amplitudes of the digital output signal with respective predefined thresholds to diagnose said at least one digital output signal in order to reveal a presence of an inappropriate contact resistance or a resistance that is present on a cable of an electric circuit of the sensor,
    the sensor transmitting a diagnostic signal based on said comparison when said high and low amplitudes are respectively lower or higher to their respective predefined thresholds.

14. A motor vehicle gearbox position sensor, comprising:

a probe for interacting with a mobile target connected to an element for actuating the ratios of a gearbox to supply at least one analog signal representative of a neutral position of the gearbox; and a signal processing unit comprising an analog-digital converter which is a pulse-width modulation (PWM) converter for converting the at least one analog signal into a at least one digital output signal whose pulse width corresponds to the neutral position, to provide a predefined periodic item of information corresponding to the neutral position only when the target is in the neutral position and when the sensor is in a normal operating state, wherein the processing unit is further configured to compare the amplitude of the digital output signal with a predefined threshold to diagnose said at least one digital output signal in order to reveal the presence of an inappropriate contact resistance or a resistance that is present on a cable of an electric circuit of the sensor, and wherein the signal processing unit is configured for stopping the transmission of the periodic item of information according to the result of the comparison of the diagnostic means.

\* \* \* \* \*